(12) United States Patent
Somendra (10) Patent No.: US 8,826,068 B2
(45) Date of Patent: Sep. 2, 2014

(54) AUTOMATED TESTING OF APPLICATIONS IN CLOUD COMPUTER SYSTEMS

(75) Inventor: Aruna Somendra, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 13/303,175

(22) Filed: Nov. 23, 2011

(65) Prior Publication Data

US 2013/0132774 A1 May 23, 2013

(51) Int. Cl.
| | |
|---|---|
| G06F 11/00 | (2006.01) |
| H04L 12/24 | (2006.01) |
| H04L 12/26 | (2006.01) |
| G06F 11/36 | (2006.01) |

(52) U.S. Cl.
CPC .......... *H04L 41/0806* (2013.01); *H04L 41/046* (2013.01); *H04L 43/50* (2013.01); *G06F 11/3692* (2013.01); *G06F 11/3688* (2013.01)
USPC ................................ 714/6.3; 714/4.5; 714/15

(58) Field of Classification Search
USPC .......................................................... 714/32
See application file for complete search history.

(56) References Cited

U.S. PATENT DOCUMENTS

| | | | |
|---|---|---|---|
| 6,192,320 B1 | 2/2001 | Margrey et al. | |
| 6,513,068 B1 | 1/2003 | Jones et al. | |
| 7,886,029 B2 | 2/2011 | Rogers et al. | |
| 8,341,462 B2* | 12/2012 | Broda et al. | 714/25 |
| 8,510,600 B2* | 8/2013 | Broda et al. | 714/25 |
| 2007/0300220 A1 | 12/2007 | Seliger et al. | |
| 2008/0244081 A1 | 10/2008 | Elangovan et al. | |
| 2009/0300423 A1* | 12/2009 | Ferris | 714/38 |
| 2010/0114867 A1 | 5/2010 | Olston | |
| 2011/0010159 A1 | 1/2011 | Birch et al. | |
| 2011/0010691 A1* | 1/2011 | Lu et al. | 717/124 |
| 2011/0016379 A1* | 1/2011 | McColl et al. | 715/219 |
| 2011/0154441 A1* | 6/2011 | Oh et al. | 726/3 |
| 2011/0239214 A1* | 9/2011 | Frields et al. | 718/1 |
| 2011/0307948 A1* | 12/2011 | Ranjan et al. | 726/9 |
| 2012/0017112 A1* | 1/2012 | Broda et al. | 714/4.4 |
| 2012/0017156 A1* | 1/2012 | Broda et al. | 715/736 |
| 2012/0054551 A1* | 3/2012 | Gao et al. | 714/38.1 |
| 2012/0066681 A1* | 3/2012 | Levy et al. | 718/1 |
| 2012/0311128 A1* | 12/2012 | Pechanec et al. | 709/224 |
| 2013/0054792 A1* | 2/2013 | Sharaf | 709/224 |
| 2013/0173962 A1* | 7/2013 | Li et al. | 714/32 |
| 2013/0247133 A1* | 9/2013 | Price et al. | 726/1 |

OTHER PUBLICATIONS

Sethaput, et al., "A Framework for Automated Unit Testing of Live Network Clouds", Retrieved at <<http://ieeexplore.ieee.org/stamp/stamp.jsp?tp=&arnumber=918067, IEEE/IFIP International Symposium on Integrated Network Management, 2001, pp. 579-592.

* cited by examiner

*Primary Examiner* — Kamini Patel
(74) *Attorney, Agent, or Firm* — Henry Gabryjelski; Kate Drakos; Micky Minhas (57) ABSTRACT

A system and method for performing automated testing of an application in a cloud environment. A controller initializes an manages a number of virtual machines (VM), each VM including a test engine. The controller retrieves configuration data, determines a number of VMs to deploy, and initializes the VMs. The controller manages each VM by providing test commands and monitoring the results. Each VM receives and executes the test commands. The system may be used to test interactive applications or non-interactive applications.

15 Claims, 8 Drawing Sheets

FIG. 8

AUTOMATED TESTING OF APPLICATIONS IN CLOUD COMPUTER SYSTEMS

BACKGROUND

In a cloud-based computer system, resources may be provided to computing devices over a network. Resources may include data storage, processing power, virtual computing machines, or other computer resources. Windows Azure™, by Microsoft Corporation, is a cloud computing platform that enables a developer to build and host applications in a datacenter provided by Microsoft. The Windows Azure platform enables a provider to run any number of virtual machines, each on a corresponding virtual hard drive. Some virtual machines may execute interactive applications. Some virtual machines may execute non-interactive applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to perform an automated test of a computer application in a cloud environment. Mechanisms may include receiving a specification of one or more test scenarios, each scenario including a set of test commands, deploying some number of virtual machines, initializing a test agent on each deployed virtual machine, providing the commands of a test scenario to each test agent, and monitoring the execution of each command by each test agent.

In one embodiment, a controller may automatically determine a number of virtual machines to deploy based on a specified need and a capacity of each virtual machine. The capacity may be a maximum number of connections or another limitation. The controller may then automatically deploy the determined number of virtual machines.

In one aspect of the mechanisms described herein, a controller may provide to each test agent the test commands by using a cloud data storage system. The controller may retrieve each command from the cloud storage, store each command in a command table in the cloud storage in a manner associated with each test agent, monitor the command table to track the status of each command execution by each test agent, and selectively provide a next command based on the result of a command execution. Each test agent may mark a status of each command with a success or failure result.

In one embodiment, at least some of the test commands are interactive commands. They may provide commands for which the test application is configured to receive user interface commands.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processor" refers to a physical component such as an integrated circuit that may include integrated logic to perform actions.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

Figure 1:
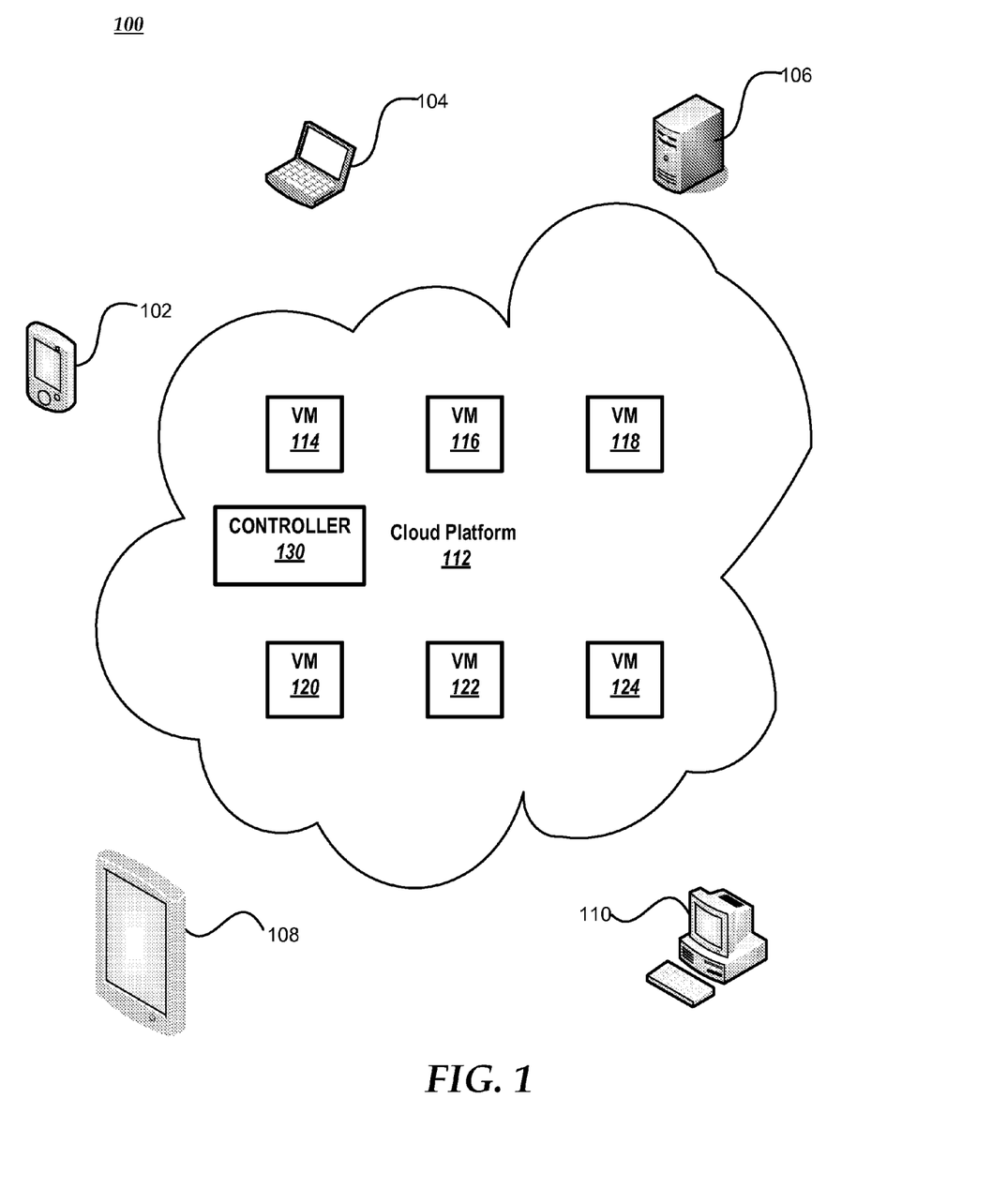
FIG. 1 is a block diagram of an example cloud environment in which mechanisms described herein may be deployed.

FIG. 1 is a block diagram of a cloud environment 100 in which embodiments may be practiced. FIG. 1 provides a basic understanding of an example cloud environment, though many configurations may be employed and many details are not illustrated in FIG. 1. As illustrated in FIG. 1, an example environment 100 includes one or more clients 102, 104, 106, 108, or 110. In FIG. 1, each client is illustrated as a computing device. For example, client 102 is a smart phone; client 104 is a laptop or other portable computing device; client 106 may be a desktop computer, server, or other relatively stationary computing device; client 108 is a tablet compute; and client 110 is a desktop computer. In various environments, clients may be in the form of any one or more computing devices, computer processes, modules, or similar components. A virtual machine in a cloud environment may be a client.

In the example embodiment of FIG. 1, environment 100 includes cloud computing platform 112, which may exist within a cloud. A cloud may be thought of as a computer network including multiple computing devices, components integrated with or accessed by computing devices, or mechanisms for communicating among computing devices or component. Components of a cloud may be physically located in one or more data centers. They are device and location independent, in that a client or user need not know the actual device or location where a component resides. In one embodiment, a cloud including cloud computing platform 112 includes the Internet, which is a network of networks. The cloud may include wired communication mechanisms, wireless communication mechanisms, or a combination thereof. Cloud computing platform 112 may employ any one or more of these mechanisms. Cloud computing platform 112 may provide virtual machines 114-124, data storage services or other services. In a cloud environment, components may access resources, such as processor or storage, without knowing the location of the resource. The underlying cloud computing platform or system manages the location and distribution of resources, and may hide the underlying architecture or locations to components that access them.

As illustrated in FIG. 1, example environment 100 may include multiple virtual machines (VM) 114-124, A virtual machine is a software container that includes an operating system and one or more applications. Multiple VMs may execute on an operating system that itself executes on a computing device. It may operate as a physical computer in that it may include a software-based CPU, memory and storage, and a network interface. External applications may interface with a VM as they would interface with a physical computer. VMs 114-124 may be implemented in any of a variety of ways.

As illustrated in FIG. 1, in example environment 100, each of clients 102, 104, 106, 108, or 110 communicates with one or more VMs 114-124. Each of VMs 114-124 may communicate with other VMs or other components within cloud computing platform 112. Communications between clients 102-110 and VMs 114-124, or other computing devices may employ one or more of various wired or wireless communication protocols, such as IP, TCP/IP, UDP, HTTP, SSL, TLS, FTP, SMTP, WAP, Bluetooth, or WLAN.

Though not illustrated in FIG. 1, in various environments, one or more applications may execute on each of VMs 114-124. The applications may provide a service to one or more clients, or support other applications that provide a service. Examples of services include a web site, a data repository, a media streaming service, a backup service, security service, software as a service, or other web services.

Figure 2:
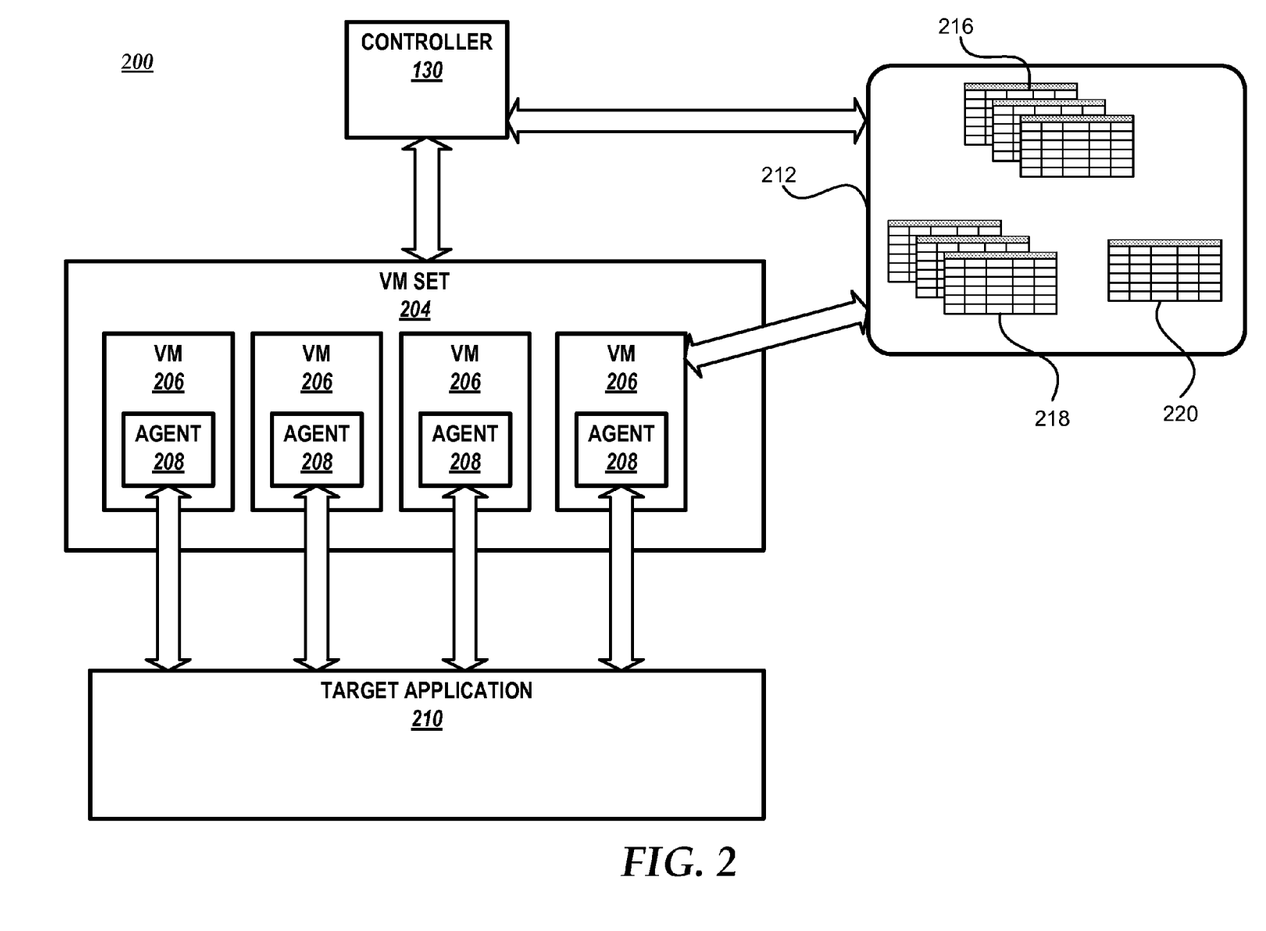
FIG. 2 is a block diagram of an example computer-based system in which mechanisms described herein may be deployed.

FIG. 2 is a block diagram of an example computer-based system 200 in which embodiments may be practiced. FIG. 2 provides a basic understanding of an example system, though many configurations may be employed and many details are not illustrated in FIG. 2. In one embodiment, system 200 is built upon cloud computing platform 112 of FIG. 1. System 200 may be made up of software or hardware components of one or more computing devices. As illustrated in FIG. 2, an example system 200 includes controller 130 and VM set 204. Controller 130 may be one or more software applications executing on one or more virtual machines. In the illustrated example, VM set 204 includes four VMs 206, each of which includes a respective test agent 208, referred to herein simply as agent 208. In various configurations, system 200 may include multiple controllers, or more or less VMs than illustrated.

In one implementation, each agent 208 is a software application or process that executes on a respective VM 206. It is understood that an application or process may be implemented by one or more software modules that operate to perform the functions of an application or process. Briefly, each agent may perform a process to execute configured commands, perform actions based on the commands, and record results. The commands and actions may be used to test interactive or non-interactive applications in the cloud. This may include, for example, communicating with, or interacting with, one or more target applications 210. Further details of this functionality are discussed herein. Consistent with a cloud architecture, each VM 114, controller 130, target application 210, and configuration data may reside on a single computing device or be distributed among multiple computing devices in a variety of ways.

In one embodiment, controller 130 may interact with each VM 206 of VM set 204. The interaction may include direct or indirect communication with each agent 208. Direct communication may include, for example, mechanisms such as messages, signals, remote function calls, or the like. Indirect communication may include, for example, storing or retrieving data from a commonly accessed memory or other data storage mechanism. In the illustrated example system, controller 130 and each agent 208 store and retrieve data from configuration data 212.

In one embodiment, configuration data 212 includes scenarios 216, counters and logs 218, and command table 220. Each of these tables may be implemented in a variety of ways, including one or more files, database tables or records, memory blocks, objects, or other such mechanisms. Though illustrated as logically distinct, the tables may be integrated or combined in a variety of ways. In one embodiment, configuration data 212 resides in a cloud storage system. In a cloud storage system, data is stored in a virtualized storage pool. The actual storage may reside on one or more servers, the physical location being hidden from a user of the storage. Windows Azure storage is one example of a cloud storage system within which configuration data 212 may reside.

In one embodiment, system 200, or portions thereof, run on the Windows Azure™ Platform, by Microsoft. Windows Azure includes an operating system that provides scalable compute and storage facilities, hosted in one or more data centers. This enables application providers to run their applications and services in a cloud environment, such as illustrated in FIG. 1. In one embodiment, controller 130 and each be ordered. Each command may have one or more associated properties. For example, one property, referred to herein as command type, specifies whether a command, or a group of commands, is to be executed serially or in parallel relative to the execution of other commands. Each command may have zero, one, or more associated parameters.

Examples of commands that may be used include commands to launch a session, login or logout to or from a session, launch an application, enter text, select items, invoke controls, or perform other actions in an application, create, manipulate, or close windows, or the like. Commands may be interactive. As used herein, an "interactive" command of an application is a command that the application is configured to receive through a user interface. These include commands that a user may enter by selecting a menu item, a user interface control, a keyboard, or the like. An interactive command may cause a window or other user interface component to be created, destroyed, or otherwise manipulated. Commands may be non-interactive, such as modifying a file or sending a message to an application outside of the user interface. In one embodiment, generic commands may be used. In a generic command, a command is specified as a parameter to a generic command. For example, a "Run" command may be a generic command. "Run 'open calculator'" and "Run 'shut down calculator'" are examples of generic commands.

In one embodiment, scenarios and commands may be represented in a markup language format, such as XML. Following is an example of an XML snippet showing a specification of two scenarios and associated commands.

```
<Scenarios>
    <Scenario ID="1">
        <Commands>
            <Command Name="Logon">
                <parameters>
                    <root>
                        <TimeOutLogonSeconds>600</TimeOutLogonSeconds>
                    </root>
                </parameters>
                <Type>Serial</Type>
                <Description>"serial login test"</Description>
            </Command>
        </Commands>
    </Scenario>
    <Scenario ID="2">
        <Commands>
            <Command Name="Connect">
                <parameters>
                    <root>
                        <TimeOutLogonSeconds>600</TimeOutLogonSeconds>
                    </root>
                </parameters>
                <Type>Serial</Type>
                <Description>"serial connection test"</Description>
            </Command>
        </Commands>
    </Scenario>
</Scenarios>
```

VM 206 are implemented as VM roles in Windows Azure. A VM role in Windows Azure runs a virtual hard drive image of a Windows Server virtual machine. The mechanisms described herein are not, however, limited to this platform, and may be employed with various other cloud computing platforms.

In one embodiment, each scenario 216 specifies a configuration for a corresponding test. Each scenario 216 may include a set of one or more commands. The commands may In one embodiment, command table 220 includes, for each test agent, an ordered set of commands to be executed by the test agent. The command table 220 may be dynamic, with commands inserted as each test agent executes commands. In one embodiment, controller 130 may retrieve commands from a current scenario, insert each command into command table 220 for each test agent, and monitor the execution of the command by each test agent. When a test agent has completed execution of a command or is otherwise ready for a next command, controller 130 may insert the next command into command table 220, associating it with the test agent.

In one implementation, each command may be inserted into command table 220 with its parameters, type, or other properties. A status corresponding to each command entry may be set to a status of "ready." A test agent may retrieve a next command corresponding to the test agent. It may mark the command entry with a status of "in progress." Upon completion of executing the command, the test agent may mark the entry as "completed." In one embodiment, controller 130 polls the data of command table 220. Upon determining that a command entry has been marked as "completed," controller 130 may insert a next command, based on the specification of a current scenario.

Table I illustrates a logical representation of an example command table. In this example, data relating to two VMs are presented. Each VM is specified by its corresponding IP address. Each VM has a corresponding sub-table, with an entry for each command. The first VM has a logon command that is marked as "complete" and a logout command that is marked as "in progress." The second VM has a single logon command that is marked as "in progress." As illustrated, each agent may receive identical sets of commands, but may be executing different commands at any given time. One or more agents may fail and terminate while others continue execution.

TABLE 1

Example Command Table

| Cmd | Type | Parameters | Status |
|---|---|---|---|
| VM 00:12:34:56:78 | | | |
| Logon | Serial | timeout = 600; name = "testname"; password = "secret" | Complete |
| Logout | Serial | timeout = 300; | In Progress |
| VM 00:12:34:34:80 | | | |
| Logon | Serial | timeout = 600; name = "testname"; password = "secret" | In Progress |

In one embodiment, each agent 208 stores logging information in counters and logs 218. The logging information may indicate commands that have been executed, results of each command execution, or other such information. Counters may include cumulative data, such as a number of commands executed, a number of successful commands, a number of failed commands, or the like. Counters and logs may be provided to a user for review of tests.

Thus, controller 130 may retrieve data such as commands to be executed from configuration data 212, and store data such as commands to be executed in command table 220. Test agents 208 may retrieve command information from command table 220 and store results of executing commands in counters and logs 218. Configuration data 212 thus serves as a mechanism for specifying test scenarios, controlling and monitoring operation of each test agent 208, and recording test results. Additionally, controller 130 may download program code to each test agent, to be used when performing tests.

Figure 3:
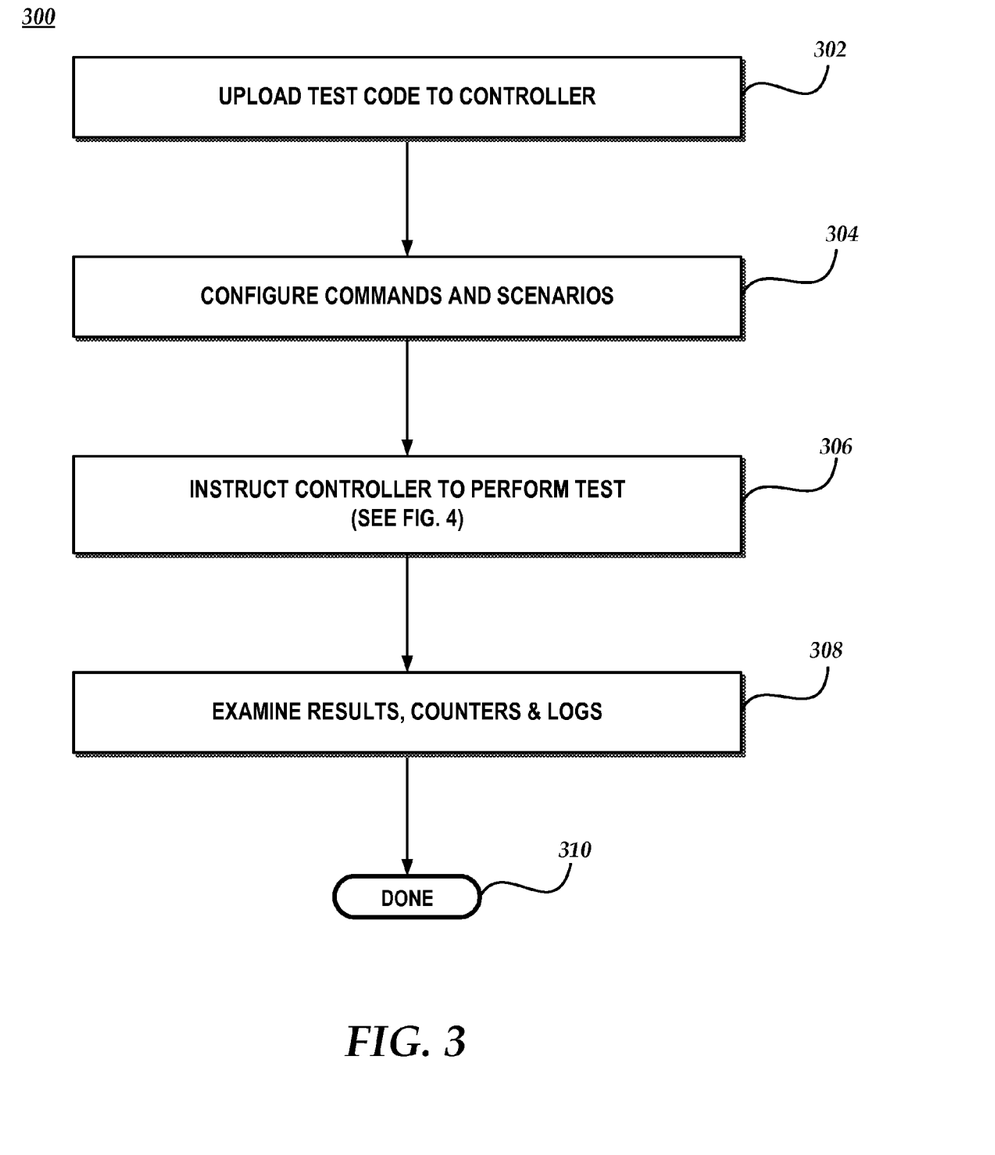
FIG. 3 is a flow diagram illustrating an example embodiment of a process for performing tests of a target application in a cloud environment, in accordance with some of the mechanisms described herein.

FIG. 3 is a flow diagram illustrating an example embodiment of a process 300 for performing tests of a target application in a cloud environment, in accordance with some of the mechanisms described herein. Process 300, or a portion thereof, may be performed by various embodiments of system 200, or a variation thereof. Components of system 200 are used as examples of an implementation herein, though in various embodiments, the correspondence of process actions and components may vary. The illustrated portions of process 300 may be initiated at block 302, where test program code may be uploaded to controller 130. As described herein, this test program code may subsequently be installed on each agent 208, as part of an initialization of the agents.

The process may flow to block 304, where one or more scenarios and their commands may be configured. In one embodiment, controller 130 includes or employs a user interface that may be employed by a user to configure scenarios and commands. The controller may store the configuration information in configuration data 212. In various embodiments, other mechanisms may be used to configure scenarios.

Figure 4:
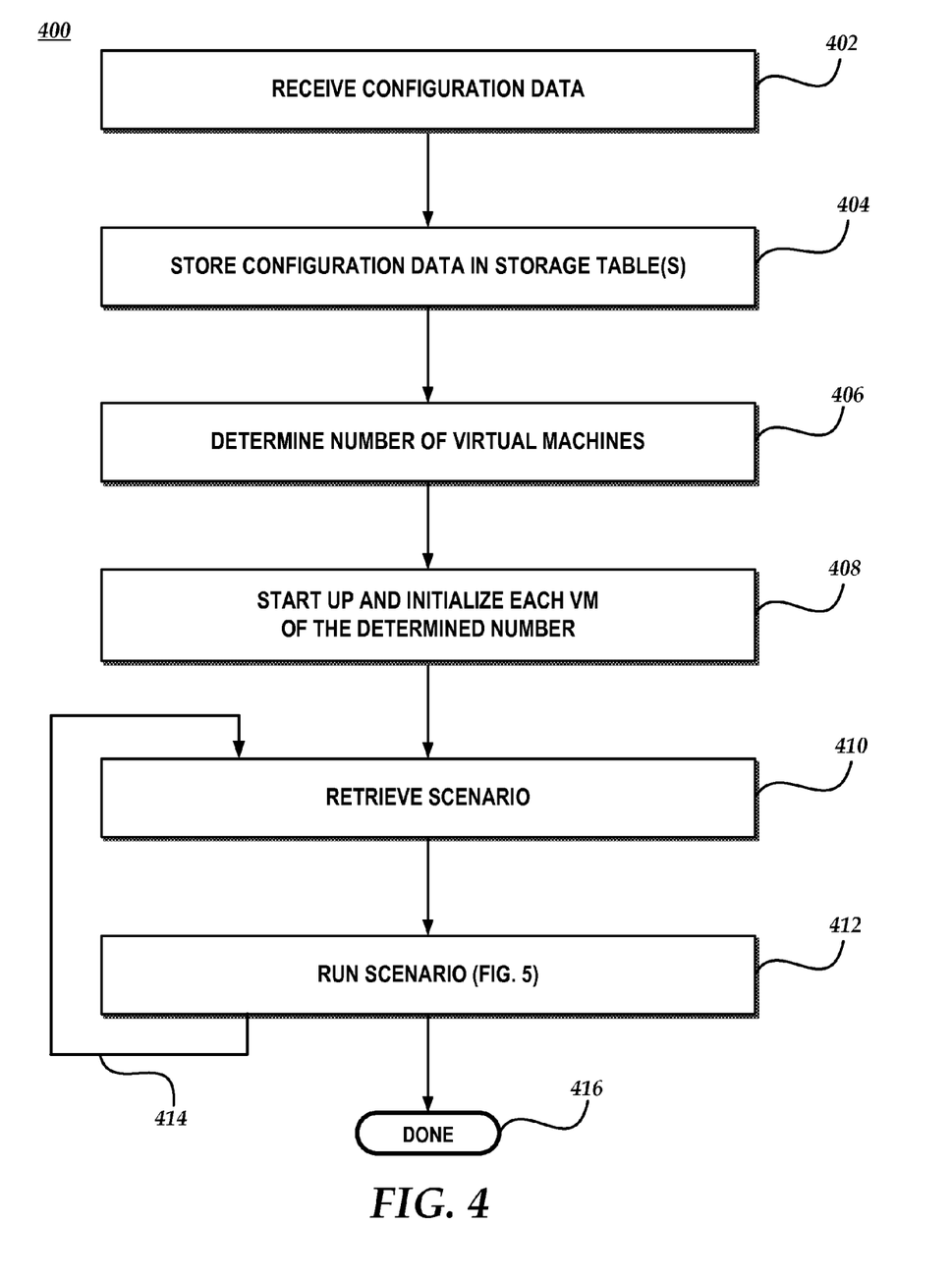
FIG. 4 is a flow diagram illustrating an example embodiment of a process for performing a test of a target application in a cloud environment, in accordance with some of the mechanisms described herein.

The process may flow to block 306, where the controller is instructed to perform a test, in some embodiments, this may include sending one or more test parameters to the controller. For example, a parameter may specify one or more scenarios to employ in the test. A parameter may specify a scale of the test, such as a number of connections desired, or another metric. Various other parameters may be used to specify settings or operation of the controller. FIG. 4 illustrates an example process of performing a test.

The process may flow to block 308, where results of the test may be examined. This may include analyzing logs or counters produced as a result of the test. This action may be performed manually by a user or automatically by a data analysis application. Test results may be graphed, compared with prior tests or specified requirements, or used in other ways. Test results may be used to configure subsequent tests.

The process may flow to done block 310 and perform other actions, not shown, or exit.

FIG. 4 is a flow diagram illustrating an example embodiment of a process 400 for performing a test of a target application in a cloud environment, in accordance with some of the mechanisms described herein. Process 400, or a portion thereof, may be used to implement actions of blocks 304 or 306 of process 300. In one embodiment, process 400, or a portion thereof, may be performed by controller 130 of FIG. 2. The illustrated portions of process 400 may be initiated at block 402, where configuration data may be received. As discussed herein, this configuration data may include specification of one or more scenarios, commands, or command parameters. In one embodiment, configuration data may be received by a user interface of controller 130 or another application. Configuration data may include specifications for scaling a test.

The process may flow to block 404, where configuration data may be stored in storage tables, such as configuration data 212.

The process may flow to block 406, where a number of virtual machines to deploy is determined. In one embodiment, this determination may be based on a capacity of each virtual machine and a test specification. In one embodiment, the capacity may be a number of connections supported. For example, a controller may receive a specification of a number of connections to be used for a test. The controller may determine, receive from the cloud computing platform, or be configured with a specification of a limit for a number of connections that each VM is to support. This capacity may be based on hardware limitations, software limitations, system load, various cost factors, or other factors. The controller may determine, based on this limit and the number of specified connections, a number of VMs to use for a test run. For example, if there is a limit of 50 connections per VM, and 1000 connections is specified for a test run, the controller may divide the specified number of connections by the limit to determine the number of V/Ms. In this example, the calculation may be 1000/50=20, so 20 VMs may be used. In other configurations, the determination of a number of virtual machines may be based on other capacities of the virtual machines, such as virtual processor speed, virtual memory capacity, or other resource limitations.

The process may flow to block 408, where the controller may start up the determined number of VMs. Each of the VMs may be initialized. In one embodiment, startup up a VM may include requesting a VM from a cloud computing platform. A cloud computing platform may perform some initialization of each VM. This may include, for example, installing an operating system or other components. Initialization of each VM may include installing or configuring test code on the VM. This may include the test code previously uploaded to the controller, as illustrated in block 302 of process 300. In some embodiments, some test code may be retrieved by the controller from another location and installed on each VM. The test code may be used to implement the test agent on the VM.s It is to be noted that, in some embodiments, some actions of process 400 may be omitted, or may have been previously performed. For example, in an environment in which multiple tests are run, VMs may be reused, so that launching of VMs and at least some initialization may be omitted if a prior configuration or a portion thereof is determined to be sufficient for reuse.

The process may flow to block 410, where a scenario may be retrieved. In one embodiment, this action includes reading or otherwise retrieving the scenario from scenarios 216 of configuration data 212, though retrieving a scenario may be performed in other ways. As discussed herein, a scenario may include one or more commands. In some configurations, the commands of a scenario may be ordered.

The process may flow to block 412, where a test run of the retrieved scenario may be performed. Briefly, in one embodiment running a scenario may include providing each command to each test agent for execution, monitoring the results, and selectively continuing the test run for each test agent, based on the results of that test agent. Further details of these actions in an example embodiment are illustrated in FIG. 5 and discussed herein.

As indicated by arrow 414, in some configurations, process 400 may flow back to block 410, where another scenario is retrieved, followed by a test run of the other scenario at block 412. This may be repeated any number of times, based on the configuration. The process may flow from block 412 to done block 416. From block 416, the process may flow to other actions, not shown, exit or return to a calling program.

Figure 5:
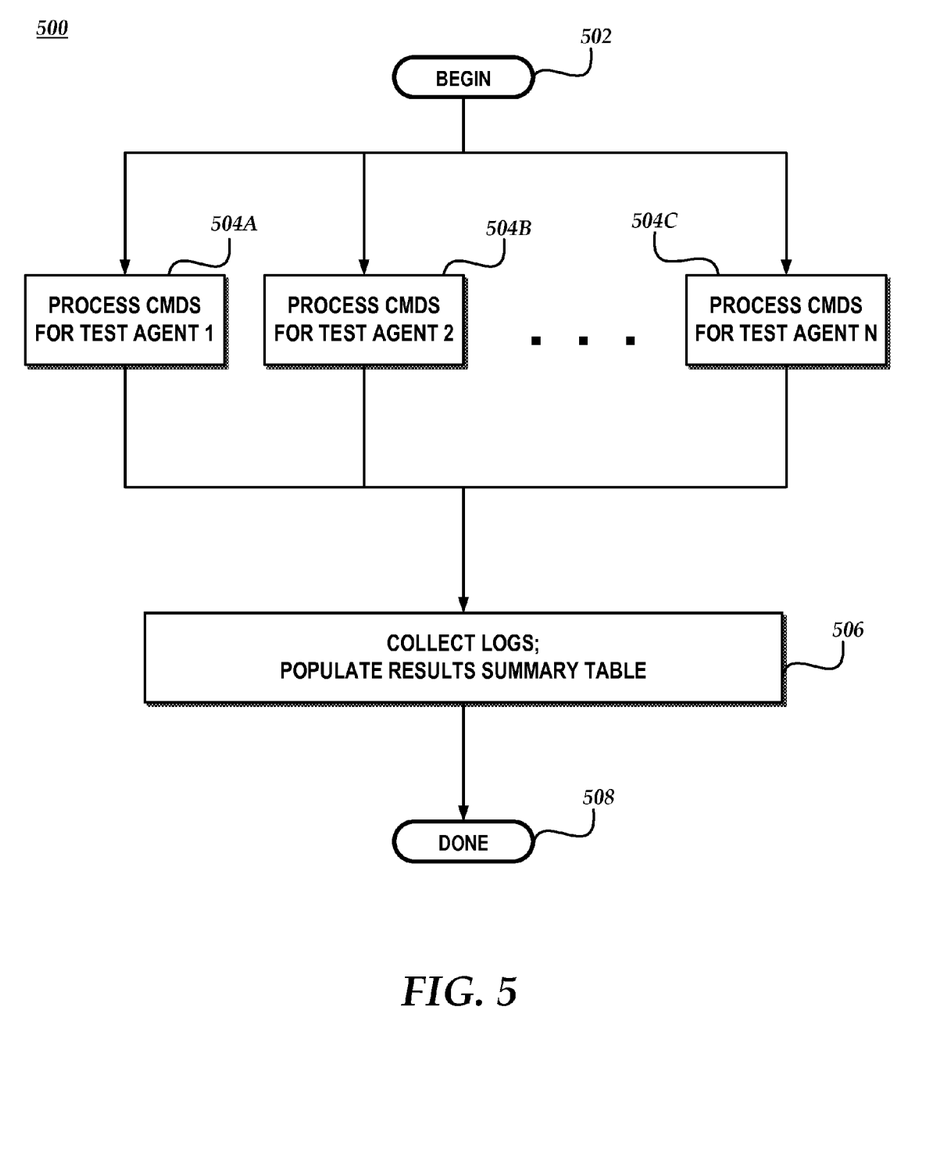
FIG. 5 is a flow diagram illustrating an example embodiment of a process for performing a test run of a scenario, in accordance with some of the mechanisms described herein.

FIG. 5 is a flow diagram illustrating an example embodiment of a process 500 for performing a test run of a scenario. Process 500 may be used to implement at least a portion of block 412 of FIG. 4. In one embodiment, process 500 may be performed by controller 130. The illustrated portions of process 500 may be initiated at begin block 502. The process may be divided into multiple sub-processes, one for each test agent. Each sub-process may include a block 504a-n, where each letter corresponds to a test agent. Thus, there may be as many blocks as there are test agents. At each block 504, processing of commands for the corresponding test agent is performed. An example embodiment of the details of this processing is illustrated in FIG. 6.

Following the processing of each block 504, the process may flow to block 506, where the various logs may be collected. The logs may be aggregated or otherwise processed to populate a results summary table. The process may flow to done block 508 and perform other actions, not shown, exit or return to a calling program.

Figure 6:
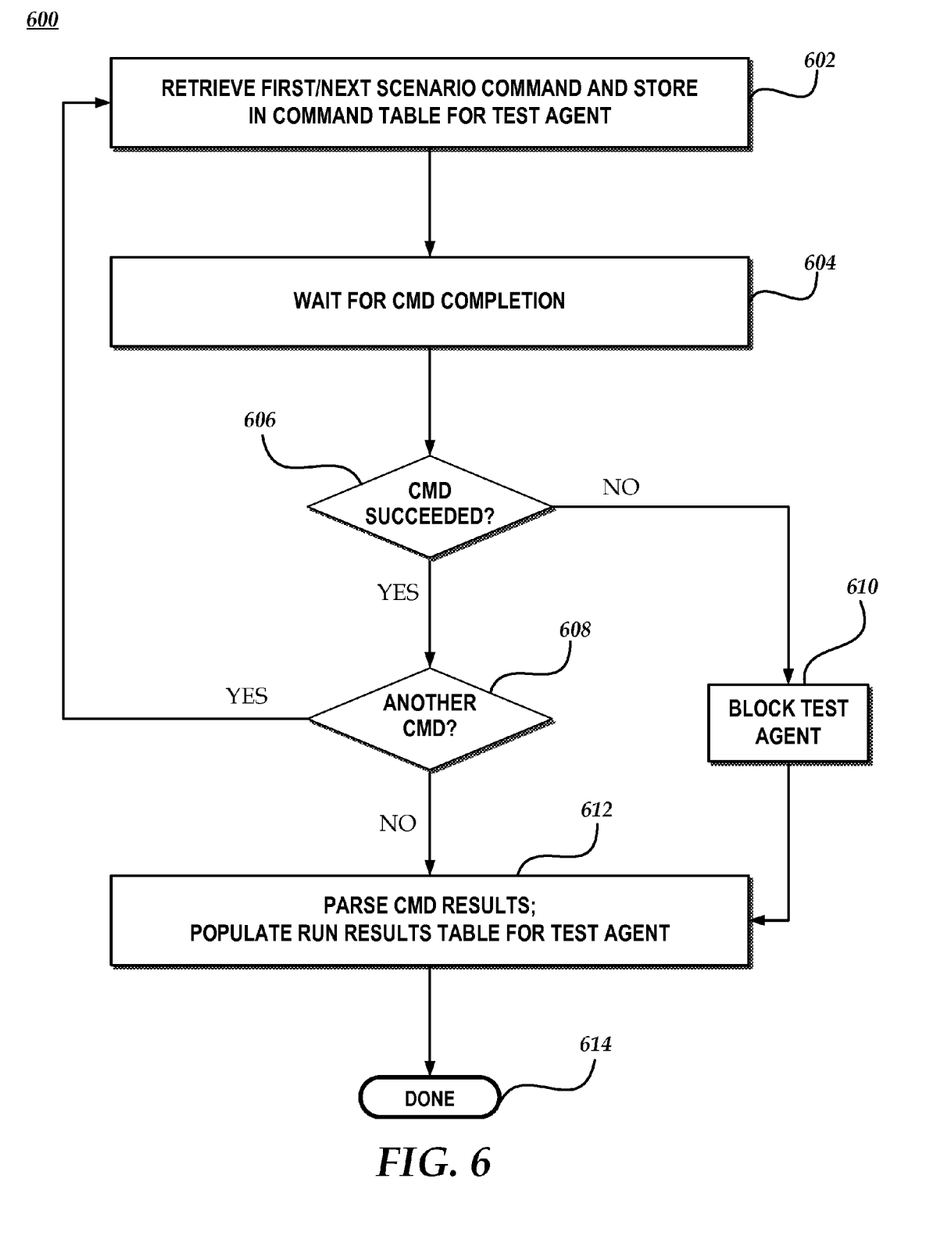
FIG. 6 is a flow diagram illustrating an example embodiment of a process for processing commands corresponding to a test agent, in accordance with some of the mechanisms described herein.

FIG. 6 is a flow diagram illustrating an example embodiment of a process 600 for processing commands corresponding to a test agent. Process 600 may be used to implement at least a portion of block 504 of FIG. 5. The illustrated portions of process 600 may be initiated at begin block 602, where the first or next command of the scenario may be retrieved from the configuration data and stored in a command table for the test agent. In one implementation, each test agent has a corresponding row or column in a common command table, and each command is placed into the appropriate row or column. In other embodiments, each command may be placed in another manner so that it can be retrieved by the corresponding test agent. In one embodiment, the status of the command and test agent may be marked as "ready".

The process may flow to block 604, where controller 130 may wait for the test agent to complete execution of the command, or for a time out to occur. This action may be implemented in variety of ways. For example, in one implementation controller 130 may periodically poll the status of the command by checking the status in the command table. In another implementation, controller 130 may receive a signal or message when a command execution is completed. Controller 130 may also use a timer to determine when command execution has timed out.

The process may flow to decision block 606, where a determination may be made of whether the execution of the command succeeded. The command may have failed or timed out. In one implementation, a time out is considered to be a fail. In one embodiment, the actions of block 606 may include retrieving, from the command table, result data that has been stored by this test agent. Thus, the cloud storage may be used by controller 130 to provide commands to each test agent as well as to monitor the results of each command execution by each test agent.

If, at decision block 606, it is determined that the command succeeded, the process may flow to decision block 608, where a determination is made of whether there is another command to be executed by this test agent. If the determination is affirmative, the process may flow back to block 602, where a next command may be retrieved and stored in the command table, as described herein. If the determination is negative, the process may flow to block 612, where processing of the command results may be performed. In one implementation, this may include parsing the command results as stored by the test agent and populating a run results table or table entry associated with the test agent.

The process may flow to done block 614, and perform other actions, exit, or return to a calling program.

If, at decision block 606, it is determined that the command execution has not succeeded, the process may flow to block 610. At block 610, the controller may block the test agent or otherwise instruct the agent to discontinue processing commands. The process may flow to block 612 and perform actions as discussed herein.

Figure 7:
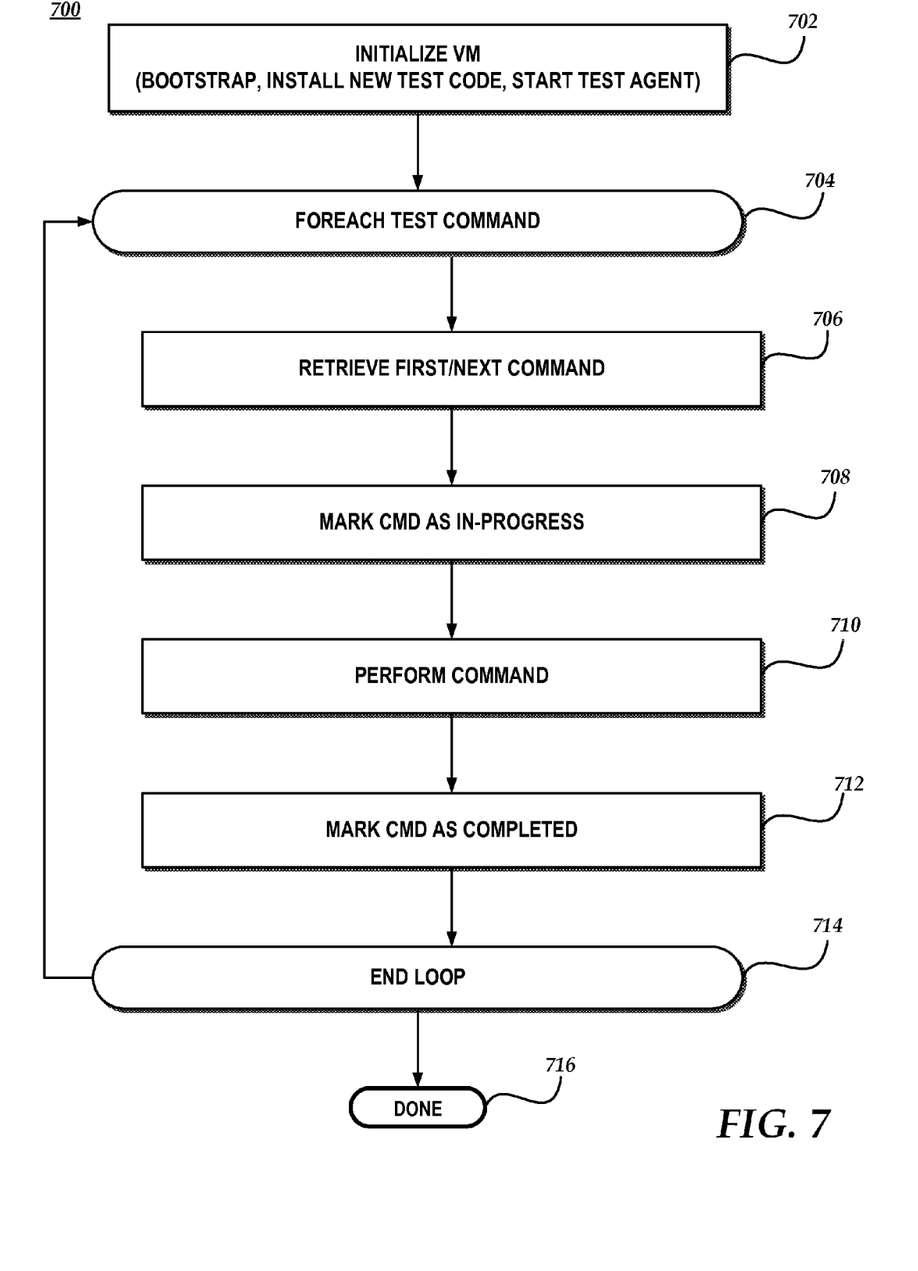
FIG. 7 is a flow diagram illustrating an example embodiment of a process for executing commands of a test scenario, in accordance with some of the mechanisms described herein.

FIG. 7 is a flow diagram illustrating an example embodiment of a process 700 for executing commands of a test scenario. Process 700 may be performed by components of a virtual machine, such as VM 206 of FIG. 2. In one embodiment, process 700, or a portion thereof, may be performed concurrently with process 600. The illustrated portions of process 700 may be initiated at block 702, where a VM is initialized. The actions of block 702 may include performing a bootstrap operation, installing new test code, starting a test agent, or other such operations.

The process may flow to block 704, which begins a loop that iterates for each test command of the scenario. The loop is referred to herein as loop 704. It includes blocks 706-712, and is terminated by block 714. In various environments, loop 704, may iterate, zero, one, or more times. In one embodiment, the actions of loop 704 may be performed by test agent 208 of FIG. 2.

Within loop 704, the process may flow to block 706, where a first or next command is retrieved. In one implementation, the command is retrieved from a command table, such as command table 220. The retrieved command may be a command that has been inserted into the command table by controller 130, such as described at block 602 of FIG. 6. The retrieved command may have associated parameters, which may also be retrieved.

The process may flow to block 708, where the command is marked with a status of "in progress." The process may flow to block 710, where the command may be executed. As described herein, a command may be a command to launch a session, login or logout to or from a session, launch an application, enter text, select items, invoke controls, or perform other actions in an application, create, manipulate, or close windows, or the like.

The process may flow to block 712, where the command status may be marked as completed. In one embodiment, a result may be included with the status or in another field. For example, a result of success or failure may be indicated.

The process may flow to block 714. At block 714, upon completion of the iterations, loop 704 may exit. The process may flow to done block 716. The process may flow to other actions, not shown, exit or return to a calling program.

Figure 8:
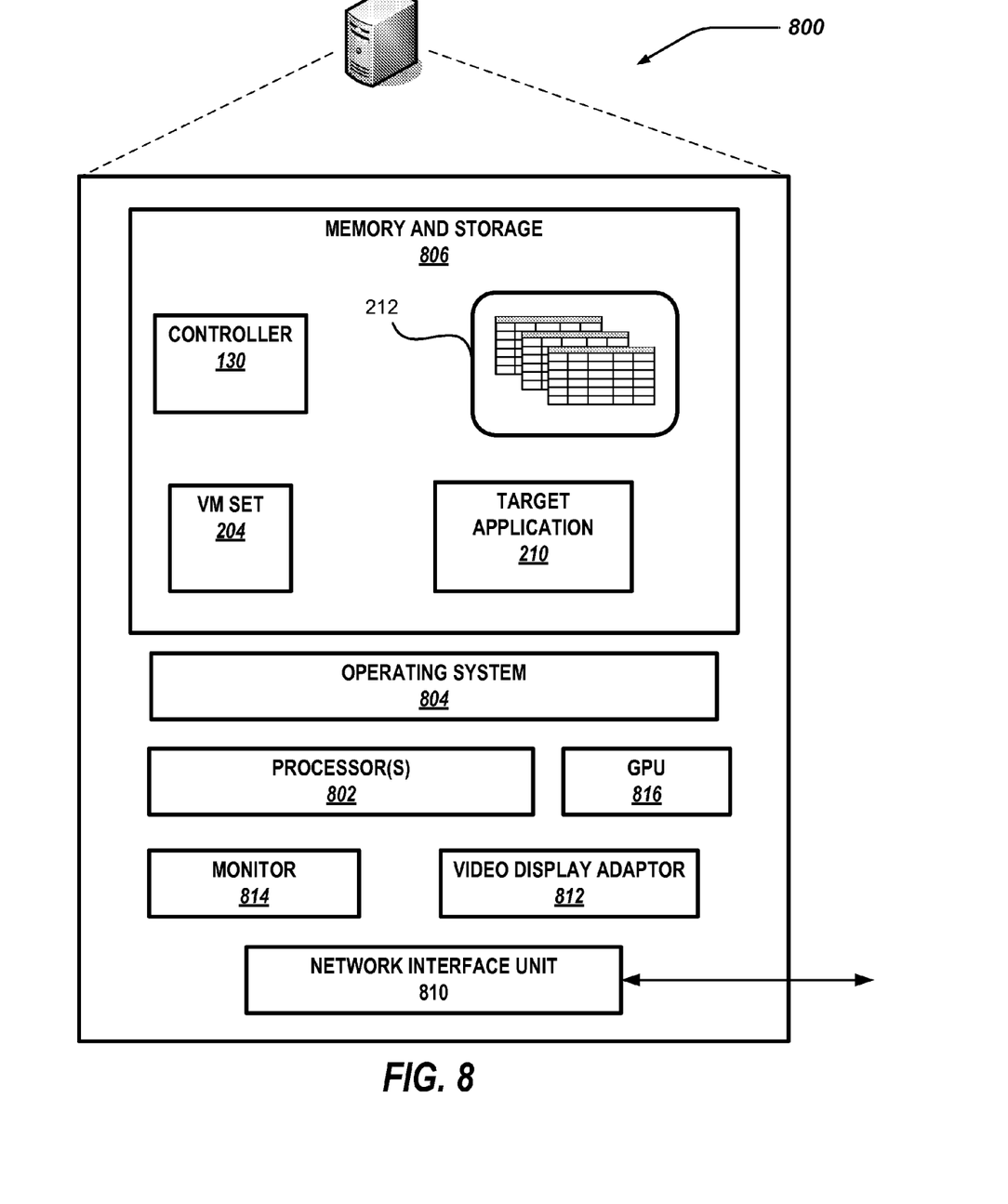
FIG. 8 is a block diagram showing one embodiment of a computing device, illustrating selected components of a computing device that may be used to implement mechanisms described herein.

FIG. 8 is a block diagram showing one embodiment of a computing device 800, illustrating selected components of a computing device that may be used to implement mechanisms described herein, including system 200 and at least portions of processes 300, 400, 500, or 600. Computing device 800 may include many more components than those shown, or may include less than all of those illustrated. Computing device 800 may be a standalone computing device or part of an integrated system, such as a blade in a chassis with one or more blades. Though the components of computing device 800 are illustrated as discrete components, any one or more of them may be combined or integrated into an integrated circuit, such as an ASIC.

As illustrated, computing device 800 includes one or more processors 802, which perform actions to execute instructions of various computer programs. In one configuration, each processor 802 may include one or more central processing units, one or more processor cores, one or more ASICs, cache memory, or other hardware processing components and related program logic. As illustrated, computing device 800 includes an operating system 804. Operating system 804 may be a general purpose or special purpose operating system. The Windows® family of operating systems, by Microsoft Corporation, of Redmond, Wash., includes examples of operating systems that may execute on computing device 800.

In one embodiment, computing device 800 includes one or more graphics processing units (GPU) 816. A GPU is a processor that is configured to perform graphics operations, such as rendering a graphic image, or to perform stream processing.

Memory and storage 806 may include one or more of a variety of types of non-transitory computer storage media, including volatile or non-volatile memory, RAM, ROM, solid-state memory, disk drives, optical storage, or any other medium that can be used to store digital information.

Memory and storage 806 may store one or more components described herein or other components. In one embodiment, memory and storage 806 stores controller 130, VM set 204, configuration data 212, or target application 210. In various embodiments, one or more of these components may be omitted from memory and storage 806. In some embodiments, at least a portion of one or more components may be implemented in a hardware component, such as an ASIC. In various configurations, multiple components implementing the functions or including the data of these components may be distributed among multiple computing devices. Communication among various distributed components may be performed over a variety of wired or wireless communications mechanisms.

Any one or more of the components illustrated as stored in memory and storage 806 may be moved to different locations in RAM, non-volatile memory, or between RAM and non-volatile memory by operating system 804 or other components. In some configurations, these components may be distributed among one or more computing devices, including computing devices that are remotely located from each other.

Computing device 800 may include a video display adapter 812 that facilitates display of data, scene frames, or other information to a user. Though not illustrated in FIG. 8, computing device 800 may include a basic input/output system (BIOS), and associated components. Computing device 800 may also include a network interface unit 810 for communicating with a network. Software components, such as those stored in memory and storage 806, may be received via transitory media and network interface unit 810. Computing device 800 may include one or more display monitors 814. Embodiments of computing device 800 may include one or more input devices (not shown), such as a keyboard, pointing device, touch screen, keypad, audio component, microphone, voice recognition component, or other input/output mechanisms.

It will be understood that each block of the flowchart illustrations of FIGS. 3-7, and combinations of blocks in each flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of performing an automated test of an computer application in a cloud environment, the method comprising:
   a) receiving a specification of a test scenario, the test scenario including a plurality of commands;
   b) automatically performing a calculation to determine a number of virtual machines to deploy based on a hardware limitation, a number of connections supported, or a resource limitation of each virtual machine;
   c) deploying the determined number of virtual machines;
   d) initializing a test agent on each deployed virtual machine; and

13 e) for each test agent, providing to the test agent one or more commands from the test scenario and selectively providing one or more additional commands based on a result of executing the one or more commands.

2. The computer-based method of claim 1, further comprising:
   a) receiving a specification of a second test scenario, the second test scenario including a plurality of commands;
   b) for each test agent, providing a set of one or more commands from the second test scenario.

3. The computer-based method of claim 1, further comprising storing the test scenario specification in a cloud storage system.

4. The computer-based method of claim 1, providing to each test agent the one or more commands comprises storing into a cloud storage system each of the one or more commands.

5. The computer-based method of claim 1, the computer application being an interactive application, at least one of the one or more commands is an interactive command.

6. A computer-based system, comprising:
   a) a cloud computing platform including a cloud storage system; and
   b) a controller configured to perform actions, including:
      i) receiving a specification of a test scenario that includes a set of commands, each command of the set of commands having a specification of whether to execute the command serially;
      ii) performing a calculation to determine a number of virtual machines to deploy based on a hardware limitation, a number of connections supported, or a resource limitation of each virtual machine;
      iii) using the cloud computing platform to deploy the number of virtual machines;
      iv) providing, to a test agent on each of the number of virtual machines, the set of commands, by storing each command of the set of commands in the cloud storage system; and
      v) retrieving a result of each command by each test agent by retrieving the result from the cloud storage system; and
   c) one or more physical processors configured to implement the cloud computing platform or the controller.

7. The computer-based system of claim 6, further comprising a set of virtual machines having the determined number of virtual machines, each virtual machine programmed to retrieve the set of commands from the cloud storage system, execute each command, and store the result of each command in the cloud storage system.

14

8. The computer-based system of claim 6, one or more of the test commands are interactive commands.

9. The computer-based system of claim 6, each test command having a corresponding specification of whether to execute the test command in parallel with one or more other test commands.

10. A computer-readable hardware storage medium having stored thereon computer program instructions for performing an automated test of an application program, the program instructions executable by one or more processors to perform actions including:
   a) performing a calculation to determine a number of virtual machines to deploy based on a hardware limitation, a number of connections supported, or a resource limitation of each virtual machine;
   b) using a cloud computer platform to deploy a set of virtual machines based on the determined number;
   c) using the cloud computer platform to provide test commands to each virtual machine of the set of virtual machines by storing the test commands in cloud storage; and
   d) employing the cloud storage to monitor results of each of the test command.

11. The computer-readable hardware storage medium of claim 10, the cloud computer platform is Windows Azure.

12. The computer-readable hardware storage medium of claim 10, determining the number of virtual machines to deploy is based on a virtual processor speed or a virtual memory capacity, or resource limitation of each virtual machine.

13. The computer-readable hardware storage medium of claim 10, the actions further comprising retrieving, from the cloud storage, a scenario specification that includes the test commands.

14. The computer-readable hardware storage medium of claim 10, one or more of the test commands are interactive commands.

15. The computer-readable hardware storage medium of claim 10, the actions further comprising:
   a) retrieving, from the cloud storage, a first scenario specification that includes the test commands;
   b) retrieving, from the cloud storage, a second scenario specification that includes additional test commands; and
   c) performing another automated test by providing the additional test commands to each virtual machine of the set of virtual machines.

* * * * *